United States Patent
Tateishi et al.

(10) Patent No.: US 9,957,970 B2
(45) Date of Patent: May 1, 2018

(54) DEVICE AND METHOD OF CONTROLLING COOLING TOWERS, AND HEAT SOURCE SYSTEM

(71) Applicant: MITSUBISHI HEAVY INDUSTRIES THERMAL SYSTEMS, LTD., Tokyo (JP)

(72) Inventors: Koki Tateishi, Tokyo (JP); Satoshi Nikaido, Tokyo (JP); Minoru Matsuo, Tokyo (JP); Toshiaki Ouchi, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 386 days.

(21) Appl. No.: 14/438,820

(22) PCT Filed: Aug. 26, 2013

(86) PCT No.: PCT/JP2013/072769
§ 371 (c)(1),
(2) Date: Apr. 27, 2015

(87) PCT Pub. No.: WO2014/077016
PCT Pub. Date: May 22, 2014

(65) Prior Publication Data
US 2015/0292514 A1  Oct. 15, 2015

(30) Foreign Application Priority Data
Nov. 14, 2012 (JP) ................................. 2012-250331

(51) Int. Cl.
*F28F 27/00* (2006.01)
*F04D 27/00* (2006.01)

(52) U.S. Cl.
CPC .......... *F04D 27/004* (2013.01); *F28F 27/003* (2013.01); *Y02B 30/748* (2013.01)

(58) Field of Classification Search
CPC ..... F28F 27/003; F04D 27/004; Y02B 30/748
(Continued)

(56) References Cited

U.S. PATENT DOCUMENTS 4,085,594 A * 4/1978 Mayer .................. F04D 27/004
236/1 E
4,252,751 A * 2/1981 Shito ..................... F04D 27/004
261/109
(Continued)

FOREIGN PATENT DOCUMENTS

CN 102261778 A 11/2011
JP 54-67251 A 5/1979
(Continued)

OTHER PUBLICATIONS

Chinese Notification of Grant of Invention Patent for Chinese Application No. 201380056153.1, dated Dec. 5, 2016, with an English translation.
(Continued)

*Primary Examiner* — Marc Norman
(74) *Attorney, Agent, or Firm* — Birch, Stewart, Kolasch & Birch, LLP

(57) ABSTRACT

To achieve energy saving in the cooling towers as a whole in a heat source system including a plurality of cooling towers connected in parallel to a common chiller. In a heat source system, a plurality of cooling towers are connected in parallel to a common chiller. The cooling towers cool cooling water used and thereby heated in the chiller, and supplies the cooled cooling water to the chiller. A cooling tower control device for controlling the cooling towers starts all the cooling towers at the start of the heat source system.

10 Claims, 8 Drawing Sheets

(58) Field of Classification Search
USPC .................................. 62/181, 183, 186, 179
See application file for complete search history.

(56) References Cited

U.S. PATENT DOCUMENTS

| | | | | |
|---|---|---|---|---|
| 4,474,027 A | * | 10/1984 | Kaya | F28C 1/00 261/26 |
| 4,554,964 A | * | 11/1985 | Awano | F28F 27/003 165/200 |
| 5,040,377 A | * | 8/1991 | Braun | F25B 49/027 165/299 |
| 6,257,007 B1 | * | 7/2001 | Hartman | F25B 49/027 62/183 |
| 2010/0023167 A1 | | 1/2010 | Ito et al. | |
| 2011/0276182 A1 | * | 11/2011 | Seem | F25B 49/027 700/276 |
| 2014/0229146 A1 | * | 8/2014 | Gonzalez | G06F 17/5009 703/2 |

FOREIGN PATENT DOCUMENTS

| | | |
|---|---|---|
| JP | 60-42597 A | 3/1985 |
| JP | 4-313695 A | 11/1992 |
| JP | 5-141897 A | 6/1993 |
| JP | 2005-257221 A | 9/2005 |
| JP | 2007-333361 A | 12/2007 |
| JP | 2010-236728 A | 10/2010 |

OTHER PUBLICATIONS

Japanese Decision to Grant a Patent for Japanese Application No. 2012-250331, dated Jan. 10, 2017.
Chinese Office Action of CN 201380056153.1 dated Jun. 2, 2016.

* cited by examiner

FIG. 5

| ITEM | RATED CONDITIONS | | |
|---|---|---|---|
| | COOLING TOWER A | COOLING TOWER B | UNIT |
| COOLING TOWER INLET TEMPERATURE | 37 | 37 | °C |
| COOLING TOWER OUTLET TEMPERATURE | 32 | 32 | °C |
| OUTSIDE AIR WET-BULB TEMPERATURE | 27 | 27 | °C |
| COOLING WATER FLOW RATE | 355.5 | 355.5 | m³/h |
| COOLING TOWER AIR VOLUME | 2988 | 2988 | m³/min |
| POWER CONSUMPTION | 9 | 6 | kW |

DEVICE AND METHOD OF CONTROLLING COOLING TOWERS, AND HEAT SOURCE SYSTEM

TECHNICAL FIELD

The present invention relates to a heat source system, and more particularly relates to a device and method of controlling cooling towers included in a heat source system.

BACKGROUND ART

As conventional methods of controlling cooling towers in a heat source system, methods disclosed in PTLs 1 to 3 are known. PTL 1 discloses a method of controlling the number of cooling towers to be started in accordance with a load ratio of a chiller and outside air wet-bulb temperature. PTL 2 discloses a method of controlling cooling water pumps and cooling tower fans based on a coefficient of performance (COP) of the heat source system. PTL 3 discloses a method wherein flow rates of cooling water that flows into cooling towers are measured, rotational speeds of fans are controlled in the respective cooling towers based on the flow rates, and the fans of the cooling towers are stopped when the flow rates of the cooling water flowing into the cooling towers are equal to or below a specified flow rate.

CITATION LIST

Patent Literature

{PTL 1}
Japanese Unexamined Patent Application, Publication No. 2010-236728
{PTL 2}
Japanese Unexamined Patent Application, Publication No. 2005-257221
{PTL 3}
Japanese Unexamined Patent Application, Publication No. 2007-333361

SUMMARY OF INVENTION

Technical Problem

However, it is difficult to sufficiently suppress power consumption in the cooling towers and to achieve energy saving by the aforementioned control methods.

More specifically, in the method disclosed in PTL 1, a required cooling capacity is determined and then the number of the cooling towers to be started is determined in accordance with the determined cooling capacity. It is possible, therefore, to demonstrate the cooling capacity to enhance the COP of the chiller, but it is difficult to save energy of the cooling towers themselves.

In the method disclosed in PTL 2, an outlet temperature of cooling water is set based on the COP of a heat source, so that the cooling capacity required for the cooling towers can be defined. However, there is no disclosure about a specific method of operating the cooling towers.

The method disclosed is PTL 3 is configured to save energy of the respective cooling towers, and no consideration is given to macroscopic energy saving in the cooling towers as a whole.

There has generally been known a method of controlling the number of cooling towers based on the temperature of cooling water inside the heat source system. However, this method is to execute simple control of increasing the number of cooling towers to be started when the cooling water temperature increases and decreasing the number when the cooling water temperature decreases, without consideration of saving energy of the cooling towers.

The present invention has been made in view of such circumstances, and an object of the present invention is to provide a device and method of controlling cooling towers, and a heat source system, capable of saving energy of a plurality of cooling towers as a whole, in the heat source system including the cooling towers connected in parallel to a common chiller.

Solution to Problem

A first aspect of the present invention is a cooling tower control device applied to a heat source system including a plurality of cooling towers connected in parallel to a common chiller, wherein at a start of the heat source system, all the cooling towers are started.

According to this aspect, all the cooling towers are started at the start of the heat source system. In other words, the fans of all the cooling towers are rotated. Since all the cooling towers which can be operated are started in this way without depending on a chiller load or the cooling capacity required for the cooling towers as a whole, the rotational speed of every fan can be reduced and power consumption can be suppressed. Energy saving can easily be achieved by simple processing of starting all the cooling towers without referring to the chiller load or the cooling capacity required for the cooling towers as a whole.

In the cooling tower control device, when rotational speeds of the fans in the cooling towers in operation are maintained in a state of being equal to or below a preregistered minimum rotational speed for a prescribed period of time, any one of the cooling towers may be stopped.

When the rotational speeds of the fans in the cooling towers are maintained in the state of being equal to or below the preregistered minimum rotational speed for the prescribed period of time, any one cooling tower out of the cooling towers is stopped, so that the rotational speed of the fans of every cooling tower can be increased. This makes it possible to avoid operation of the fans in an extremely low rotational speed range.

For example, the minimum rotational speed is a lower limit rotational speed set in the specifications of the cooling towers, or a value with an arbitrary margin added thereto.

The cooling tower control device may include: an estimation section for estimating a cooling capacity to be obtained from operating each of the fans in the cooling towers currently in operation and one more cooling tower at the minimum rotational speed, while at least one of the cooling towers is stopped; and a determination section for determining whether or not the cooling capacity required for the cooling towers as a whole is maintained in a state of being equal to or above the cooling capacity estimated by the estimation section for a prescribed period of time. When the determination section determines that the state is maintained for the prescribed period of time, one of the stopped cooling towers may be started.

Therefore, in the case of additionally starting one of the stopped cooling towers when part of the cooling towers is stopped, it is first confirmed that the fans of the respective cooling towers can be operated at the minimum rotational speed or more even if one cooling tower is added, and then the one cooling tower is added. This makes it possible to prevent frequent repetition of start and stop of the cooling towers and to stabilize the entire heat source system. By executing such control, as many cooling towers as possible can be started. As a result, power consumption can effectively be suppressed and energy saving can be achieved.

In the cooling tower control device, a start priority may be set in descending order of cooling efficiency of the cooling towers, and the cooling towers to be stopped and the cooling towers to be restarted may be determined based on the start priority.

Therefore, when the cooling efficiency of the cooling towers is different, control is executed so that the cooling towers lower in the cooling efficiency are preferentially stopped, while the cooling towers higher in the cooling efficiency are maintained in the started state. As a result, power consumption can further be suppressed.

In the cooling tower control device, the fans of the respective cooling towers may be operated at an identical rotational speed irrespective of the cooling efficiency of the cooling towers.

It has been confirmed that when cooling towers relatively high in the cooling efficiency and cooling towers relatively low in the cooling efficiency are present, and these cooling towers are operated with the rotational speed of the fans in the cooling towers relatively high in the cooling efficiency being set higher and the rotational speed of the fans in the cooling towers relatively low in the cooling efficiency being set lower, an effect of difference in the rotational speed on power consumption is not very significant. Therefore, power consumption can be suppressed by simple control of giving the same rotational speed command to all the fans irrespective of the cooling efficiency.

In the cooling tower control device, when cooling water temperature is maintained in a state of being equal to or above a specified threshold value for a prescribed period of time, any one of the stopped cooling towers may be started, and when the cooling water temperature is maintained in a state of being equal to or below a specified threshold value for a prescribed period of time, any one cooling tower out of the cooling towers in operation may be stopped.

When the cooling towers are started or stopped in consideration of the cooling water temperature in this way, the cooling water can directly be controlled within a specified range, so that a cooling water system and the chiller can stably be operated.

In the cooling tower control device, when an opening of the bypass valve is maintained in a state of being equal to or above a specified opening for a prescribed period of time, any one cooling tower out of the cooling towers in operation may be stopped.

When the cooling towers are stopped in consideration of the cooling water bypass valve in this way, inefficient excessive operation of the cooling towers can be avoided. In short, power consumption of the cooling towers can be suppressed.

In the cooling tower control device, when the rotational speeds of the fans in the cooling towers are maintained in a state of being equal to or above a specified threshold value for a prescribed period of time, any one of the stopped cooling towers may be started.

When the cooling towers are started in consideration of deterioration of the cooling towers in this way, it becomes possible to prevent delay in additional start of the cooling tower when the cooling tower performance is deteriorated, and to avoid continuation of inefficient operation at a high fan rotational speed. In short, power consumption in the cooling towers can be suppressed.

A second aspect of the present invention is a heat source system including: a chiller; a plurality of cooling towers connected in parallel to the chiller; and one of the cooling tower control devices described above.

A third aspect of the present invention is a method of controlling cooling towers applied to a heat source system including a plurality of cooling towers connected in parallel to a common chiller, the method including starting all the cooling towers at a start of the heat source system.

Advantageous Effects of Invention

According to the present invention, an effect that energy saving in the cooling towers as a whole can be achieved.

BRIEF DESCRIPTION OF DRAWINGS

FIG. 5 illustrates conditions for the cooling towers in simulation.

DESCRIPTION OF EMBODIMENTS

Hereinbelow, a device and method of controlling cooling towers, and a heat source system according to one embodiment of the present invention will be described with reference to the drawings.

Figure 1:
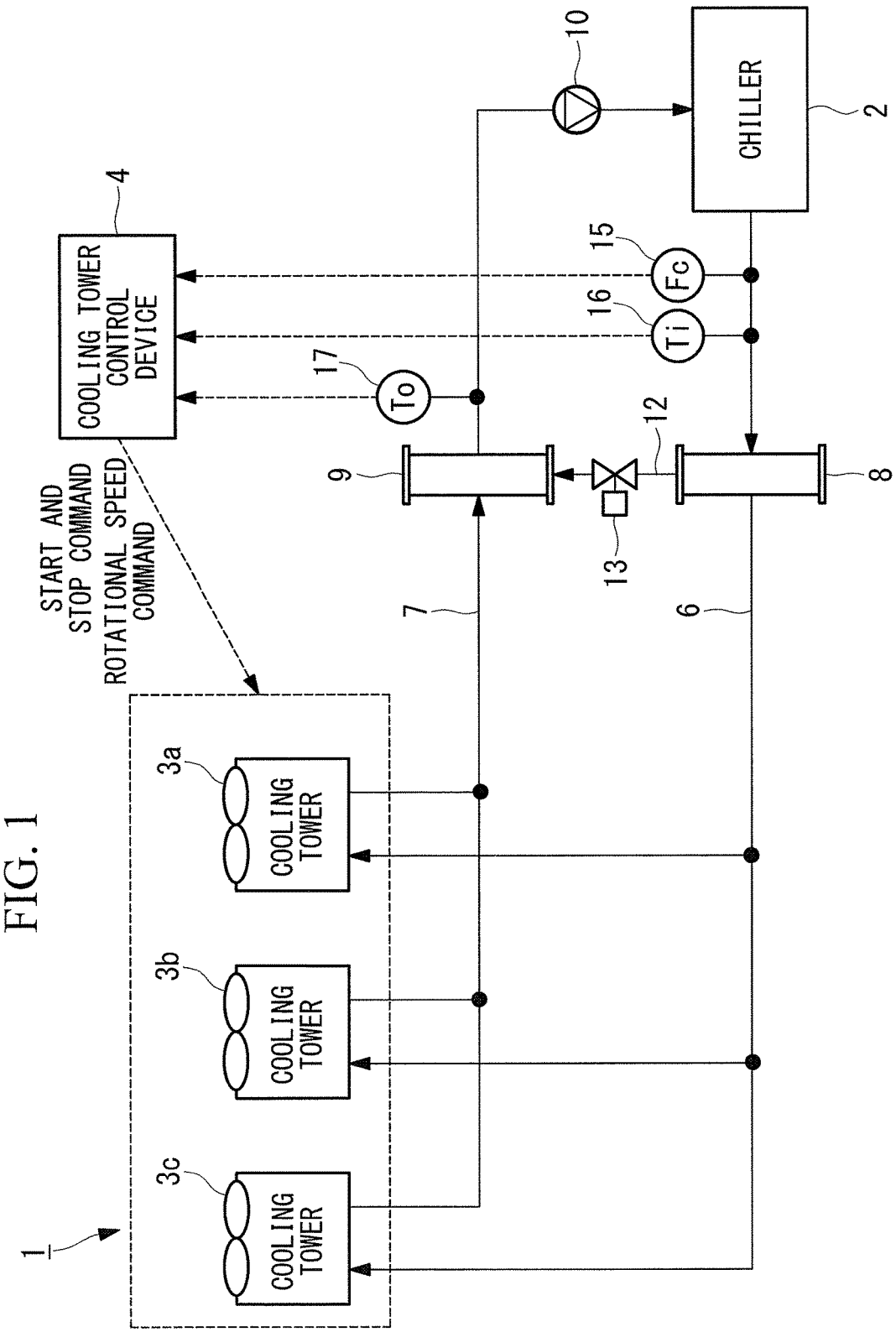
FIG. 1 is a schematic view illustrating the configuration of a heat source system according to one embodiment of the present invention.

FIG. 1 is a schematic view illustrating the configuration of a heat source system according to one embodiment of the present invention. As illustrated in FIG. 1, a heat source system 1 mainly includes a chiller 2, three cooling towers 3a, 3b, and 3c connected in parallel to the chiller 2 for cooling the cooling water used and thereby heated in the chiller 2 and supplying the cooled cooling water to the chiller 2, and a cooling tower control device 4 for controlling the cooling towers 3a, 3b, and 3c. Although FIG. 1 illustrates the case of including three cooling towers, the number of cooling towers is not limited.

The cooling water used in the chiller 2 is supplied to each of the cooling towers 3a, 3b, and 3c via a forward pipe 6. The cooling water cooled in each of the cooling towers 3a, 3b, and 3c are sent to the chiller 2 via a return pipe 7. The forward pipe 6 is equipped with a feed header 8, and the return pipe 7 is equipped with a return header 9. The return pipe 7 is equipped with a cooling water pump 10 provided on the downstream side of a cooling water flow from the return header 9. When a rotational speed of the cooling water pump 10 is controlled, a flow rate of the circulating cooling water is adjusted. A bypass pipe 12 is provided between the feed header 8 and the return header 9. The bypass pipe 12 is equipped with a cooling water bypass valve (bypass valve) 13. When an opening of the cooling water bypass valve 13 is adjusted, a flow rate of the water bypassed from the feed header 8 to the return header 9 is adjusted.

In a portion of the forward pipe 6 on the upstream side of the cooling water flow from the feed header 8, there are provided a flow rate sensor 15 for measuring a flow rate Fc of the cooling water flowing from the chiller 2, and a temperature sensor 16 for measuring the temperature of the cooling water after heat exchange in the chiller 2 (hereinafter referred to as "cooling tower inlet temperature Ti"). The return pipe 7 is equipped with a temperature sensor 17 on the downstream side of the cooling water flow from the return header 9 for measuring the temperature of the cooling water cooled in the cooling towers 3a, 3b, and 3c and flowing into the chiller 2 (hereinafter referred to as "cooling tower outlet temperature To").

Values measured by the flow rate sensor 15 and the temperature sensors 16 and 17 are output to the cooling tower control device 4.

The cooling tower control device 4 controls the rotational speeds of fans in the cooling towers 3a, 3b, and 3c with use of the measurement values from the flow rate sensor 15 and the temperature sensors 16 and 17, while performing start-and-stop control illustrated below.

For example, the cooling tower control device 4 is, for example, a computer including a central processing unit (CPU), a main memory unit such as a random access memory (RAM), an auxiliary storage unit, and a communication device that communicates with external apparatuses to exchange information.

The auxiliary storage unit is a computer readable non-transitory recording medium, such as magnetic disks, magneto-optical disks, CD-ROMs, DVD-ROMs, and semiconductor memories. The auxiliary storage unit stores various kinds of programs. The CPU reads out the programs from the auxiliary storage unit to the main memory unit, and executes them to implement various processes.

First Embodiment

Figure 2:
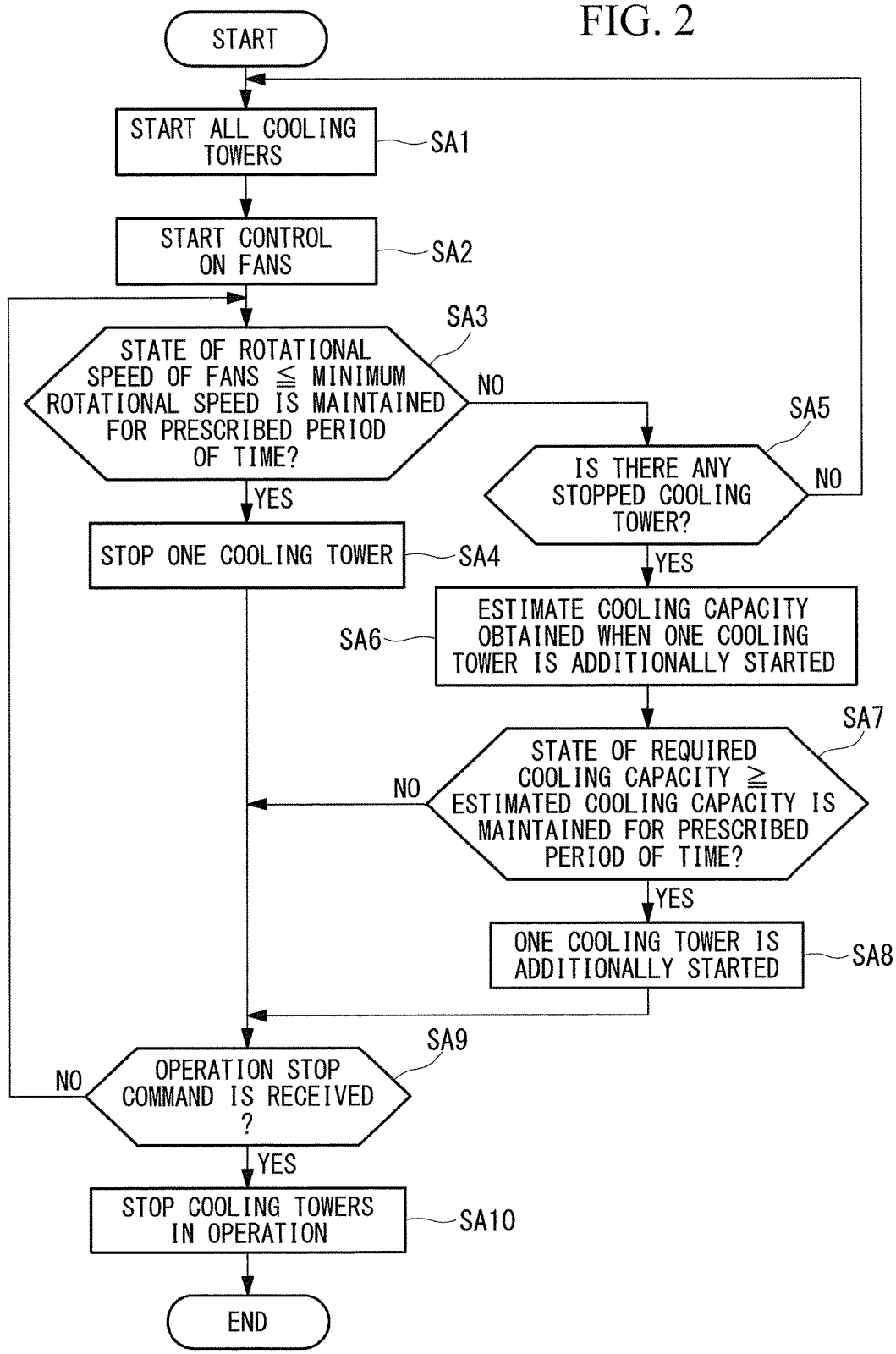
FIG. 2 is a flow chart illustrating the processing executed by a cooling tower control device according to a first embodiment of the present invention.

Hereinafter, the processing executed by the cooling tower control device 4 according to the first embodiment of the present invention will be described with reference to FIG. 2.

First, the cooling tower control device 4 starts all the cooling towers upon reception of a cooling tower start command (step SA1). Consequently, the cooling towers 3a, 3b, and 3c are started and the fans are rotated, so that cooling water is started to be cooled.

Next, when start of the respective cooling towers 3a, 3b, and 3c is completed, the cooling tower control device 4 starts to control the rotational speeds of the fans included in the respective cooling towers 3a, 3b, and 3c (step SA2). As a consequence, the rotational speeds of the fans in the respective cooling towers 3a, 3b, and 3c are controlled so that the cooling tower outlet temperature To reaches a preset temperature. In the present embodiment, the rotational speeds of the fans included in each of the cooling towers 3a, 3b, and 3c are controlled to be identical.

The cooling tower control device 4 then determines whether or not the rotational speeds of the fans are maintained in the state of being equal to or below a preset minimum rotational speed for a prescribed period of time (for example, 60 sec) (step SA3). Here, the minimum rotational speed is a lower limit rotational speed generally set to prevent operation at an extremely low rotational speed. The minimum rotational speed may be a value with an arbitrary margin added to the lower limit rotational speed.

As a result, when the rotational speeds of the fans are maintained in the state of being equal to or below the preset minimum rotational speed for the prescribed period of time, one cooling tower is stopped (step SA4) and the processing proceeds to step SA9.

When it is determined in step SA3 that the rotational speed of the fans are not maintained in the state of being equal to or below the preset minimum rotational speed for the prescribed period of time, ("NO" in step SA4), then it is determined whether or not there is any stopped cooling tower (step SA5). As a result, when there is no stopped cooling towers, the processing returns to step SA1, whereas when there is any stopped cooling tower, the cooling capacity to be obtained from operating all the cooling towers in operation and one more cooling tower at the minimum rotational speed is estimated (step SA6). For example, when N cooling towers are in operation, the cooling capacity is estimated as follows.

For example, the cooling tower control device 4 retains a table corresponding to each of the cooling towers, in which the cooling capacity of each of the cooling towers operated at the minimum rotational speed is associated with outside air wet-bulb temperatures and cooling water flow rates. By using the tables corresponding to the cooling towers in operation and the cooling tower to be additionally started, the cooling tower control device 4 acquires the cooling capacities of these cooling towers corresponding to a current cooling water flow rate and outside air wet-bulb temperature, and adds up the acquired cooling capacities. As a result, the cooling tower capacity in the case of adding one cooling tower is estimated.

Next, it is determined whether or not the cooling capacity required for the cooling towers as a whole is maintained in the state of being equal to or above the cooling capacity estimated in step SA6 for a prescribed period of time (for example, 300 sec) (step SA7). As a result, when the state is maintained for the prescribed period of time, one cooling tower out of the stopped cooling towers is additionally started (step SA8), and the processing proceeds to step SA9.

When it is determined in step SA7 that the state is not maintained for the prescribed period of time, the processing proceeds to step SA9.

In step SA9, it is determined whether or not an operation stop command is received. When the command is not received, the processing returns to step SA3, and the above-described processes are repeated. When the operation stop command is received, the cooling towers in operation are stopped (step SA10), and the processing is ended.

Figure 3:
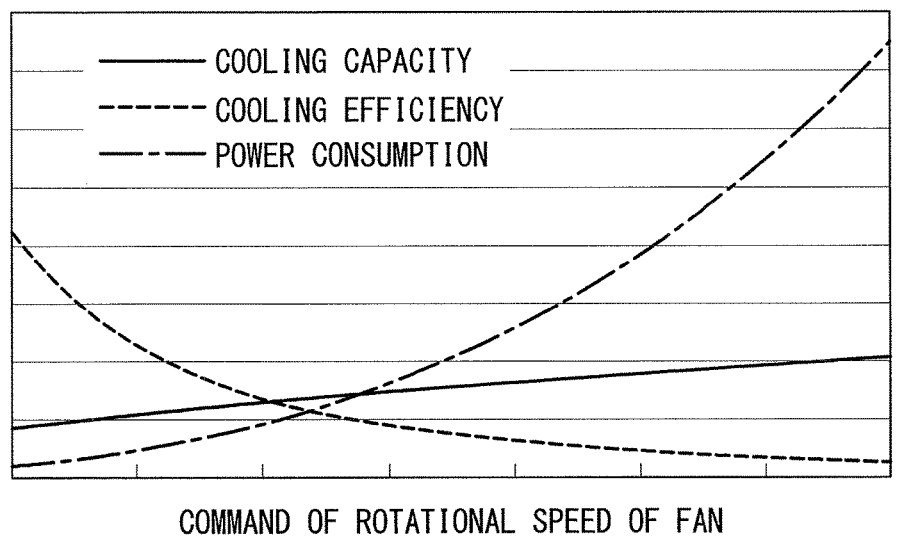
FIG. 3 illustrates rotational speed in relation to power consumption, cooling capacity, and cooling efficiency of the cooling tower.

As described in the foregoing, according to the device and method of controlling cooling towers, and the heat source system according to the present embodiment, all the cooling towers that can be operated are started at the start of the heat source system 1. Accordingly, the rotational speed of the fan in each of the cooling towers can be controlled to be low, so that the entire power consumption can be suppressed. FIG. 3 illustrates the rotational speed of the fan in relation to power consumption, cooling capacity, and cooling efficiency of the cooling tower. Here, the cooling capacity of the cooling tower is expressed by the following expression (1), and the cooling efficiency is expressed by the following expression (2):

$$\text{Cooling capacity} = \Delta T \times Fc \times c \quad (1)$$

$$\text{Cooling efficiency} = \text{cooling capacity/power consumption} \quad (2)$$

In the expression (1), $\Delta T$ represents a difference between a cooling tower inlet temperature and a cooling tower outlet temperature, Fc represents a cooling water flow rate, and c represents a specific heat.

As illustrated in FIG. 3, the power consumption is lower and the cooling efficiency is higher as the rotational speed of the fan is lower. Therefore, when the rotational speed of the fan is maintained as low as possible, the power consumption is suppressed and the cooling efficiency is enhanced.

Figure 4:
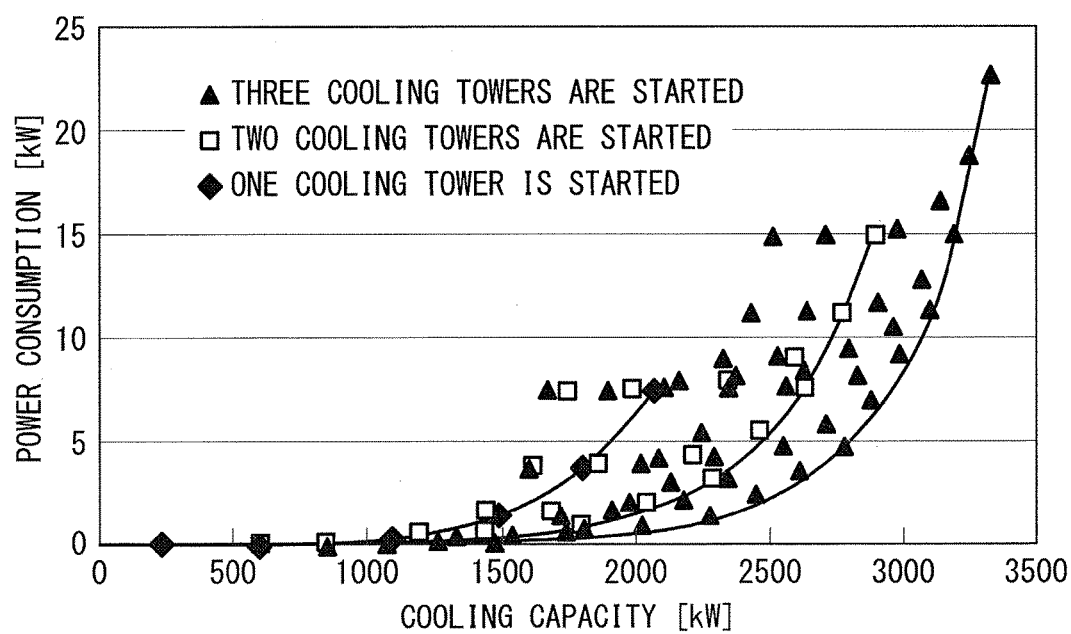
FIG. 4 illustrates a relation between the cooling capacity and the power consumption per number of the cooling towers to be started, on the assumption that cooling water channels to the respective cooling towers are identical.

FIG. 4 illustrates a relation between the cooling capacity and the power consumption per number of the cooling towers to be started, on the assumption that cooling water channels to the respective cooling towers are identical. FIG. 4 illustrates a relation between the cooling capacity and the power consumption in each of the cases where one cooling tower is operated, two cooling towers are operated, and three cooling towers are operated. Each plot in FIG. 4 represents a plot obtained when a plurality of rotational speeds of the respective cooling towers are combined.

For example, in the case of starting two cooling towers to demonstrate a certain cooling capacity, a plurality of combinations of load distribution to the respective cooling towers are present. For example, when a certain cooling capacity is requested, the same cooling capacity may be obtained in both cases of: operating one cooling tower at 30 Hz and the other cooling tower at 50 Hz; and operating both the cooling towers at 40 Hz. Even when the same cooling capacity is demonstrated in this way, operating points, i.e., the rotational speeds of the cooling towers, are different from each other, and therefore the power consumption changes in proportion thereto. A plurality of rotational speed distribution ratios are set to obtain the same cooling capacity, and the power consumption and the cooling capacity in each of these patterns are plotted in FIG. 4. Curves illustrated in FIG. 4 are formed by connecting plots obtained with the rotational speeds of the respective cooling towers set to be identical. FIG. 4 indicates that the power consumption can be suppressed the most when the rotational speeds are set to be identical.

Each plot illustrated in FIG. 4 is acquired on the assumption that the cooling towers are started when water is fed thereto. Therefore, when three cooling towers are started (water is fed to three cooling towers), but the rotational speed in one of these cooling towers is 0, then the cooling capacity needs to be demonstrated substantially by only two cooling towers. The performance in this case may appear lower than the performance in the case where two cooling towers are started (water is fed to two cooling towers). Although FIG. 4 illustrates the result in the case where the cooling towers were assumed to be started when water was fed thereto, the same result was obtained in the case where the cooling towers were assumed to be started when the fans of the cooling towers were rotated and water was fed to the cooling towers. This indicates that in both the cases, the power consumption can be reduced most when the cooling towers are each rotated at an identical rotational speed.

Furthermore, FIG. 4 indicates that the power consumption can be reduced more as the number of cooling towers to be started is larger. For example, when the cooling capacity of 2000 {kW} is attempted to be obtained with three cooling towers, the power to be consumed is about 1 {kW}. When the same cooling capacity is attempted to be obtained with two cooling towers, the power to be consumed is twice the former value or more. When the same cooling capacity is further attempted to be obtained with one cooling tower, the power to be consumed is almost seven times larger than the former value.

As is clear from FIGS. 3 and 4 as described above, for the same cooling capacity, the power consumption of the cooling towers as a whole can be suppressed the most when the number of cooling towers to be started is increased while the rotational speed of each fan is kept low, and the rotational speeds in each of the cooling towers are made uniform.

Therefore, energy saving in the cooling towers as a whole can be achieved by starting all the cooling towers that can be operated at the start of the cooling towers as in the device and method of controlling cooling towers, and the heat source system according to the present embodiment.

In the device and method of controlling cooling towers, and the heat source system according to the present embodiment, the number of cooling towers in operation is decremented by one when the rotational speeds of the fans are equal to or below the minimum rotational speed. This can avoid the situation where the fans are operated in the range of a minimum rotational speed or less.

As described in the foregoing, when the required cooling capacity is increased while part of the cooling towers are stopped, one cooling tower out of the stopped cooling towers is additionally started. In this case, one cooling tower is additionally started after it is confirmed that the fan of each cooling tower can be operated at a minimum rotational speed or more even when one cooling tower is additionally started. This makes it possible to prevent frequent repetition of start and stop of the cooling towers and to stabilize the entire heat source system. Execution of such control can start as many cooling towers as possible, so that the power consumption can effectively be suppressed, and energy saving can be achieved.

Furthermore, in the device and method of controlling cooling towers, and the heat source system according to the present embodiment, the rotational speeds of the fans included in the cooling towers are controlled to be identical irrespective of the cooling efficiency that each of the cooling towers can demonstrate.

Figure 6:
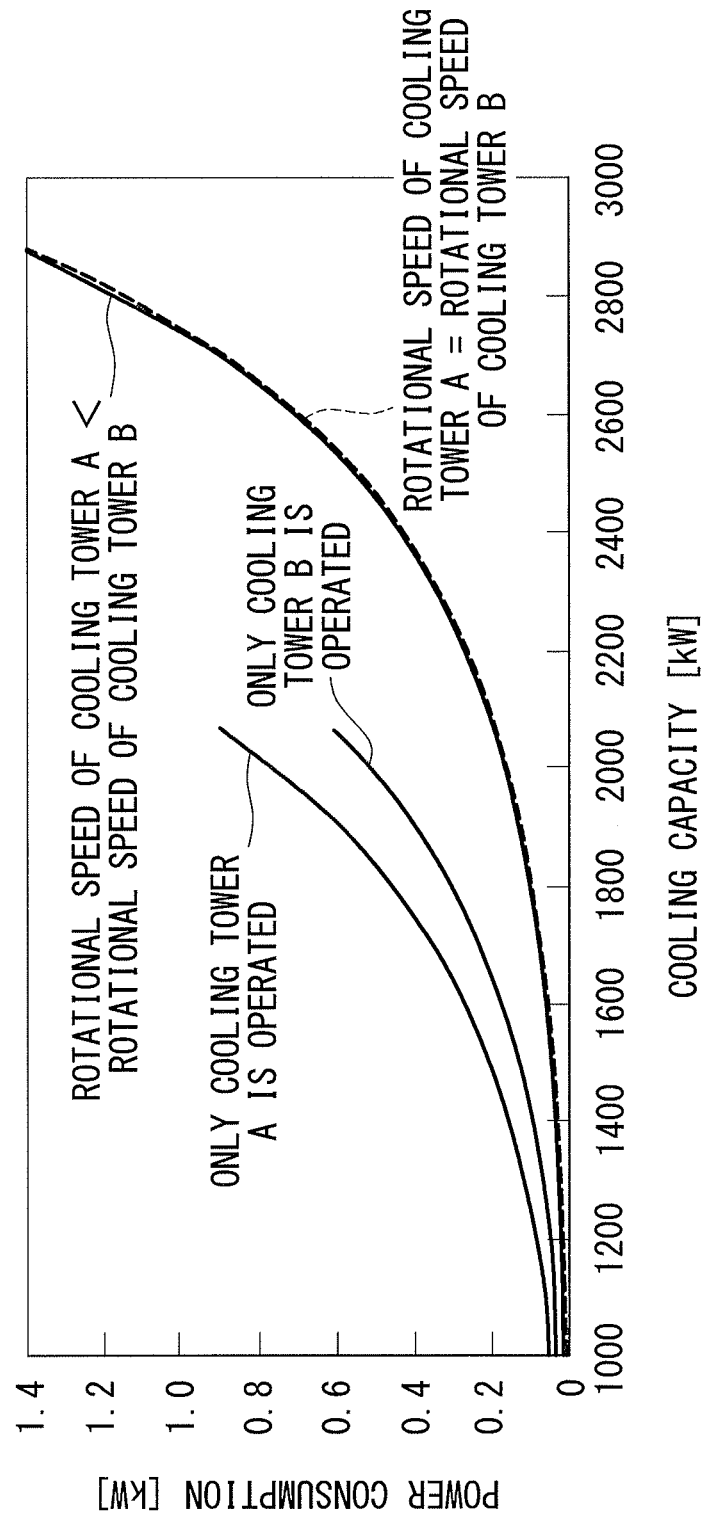
FIG. 6 illustrates a relation between the cooling capacity and the power consumption on the assumption of the cooling towers under the conditions illustrated in FIG.

For example, two cooling towers different in the cooling capacity is assumed as illustrated in FIG. 5, and a relation between the cooling capacity and the power consumption is simulated. The result of the simulation is illustrated in FIG. 6. The result of the simulation is obtained based on the relation that the power consumption is proportional to a cube of the rotational speed.

As illustrated in FIG. 6, it was found out that when both a cooling tower A relatively low in the cooling efficiency and a cooling tower B relatively high in the cooling efficiency are operated, substantially the same characteristics are demonstrated both in the case where the cooling capacity is distributed to the cooling tower A and the cooling tower B at an optimum ratio ("rotational speed of cooling tower A<rotational speed of cooling tower B" in FIG. 6), and in the case where the rotational speeds of the cooling tower A and the cooling tower B are set to be identical ("rotational speed of cooling tower A=rotational speed of cooling tower B" in FIG. 6).

In this simulation, the power consumption of the cooling tower A in rated operation is set to 9 kW and the power consumption of the cooling tower B in rated operation is set to 6 kW as illustrated in FIG. 5. However, in actuality, the difference in the power consumption in this magnitude between the cooling towers rarely occurs. Therefore, it was found out that even when a plurality of cooling towers slightly different in the cooling efficiency are used, it is not necessary to control the rotational speeds in accordance with the difference in the cooling efficiency, and that sufficient energy saving can be achieved by giving the same rotational speed command to all the cooling towers.

Furthermore, as is clear from FIGS. 5 and 6, when only one cooling tower is started, the cooling tower B is lower in the power consumption than the cooling tower A (see "only cooling tower B is operated", and "only cooling tower A is operated" in FIG. 6). Therefore, when one cooling tower is stopped due to decrease in the required cooling capacity (step SA4 in FIG. 2), the cooling tower low in the cooling efficiency may preferentially be stopped. On the contrary, when one cooling tower is additionally started due to increase in the required cooling capacity (step SA8 in FIG. 2), the cooling tower high in the cooling efficiency may preferentially be started. Therefore, when the priority is determined in proportion to the cooling efficiency, and start-and-stop control is executed based on this priority, power consumption can be suppressed in the case where, for example, sufficient output can be achieved by operating only one cooling tower due to a low required cooling capacity.

Second Embodiment

Figure 7:
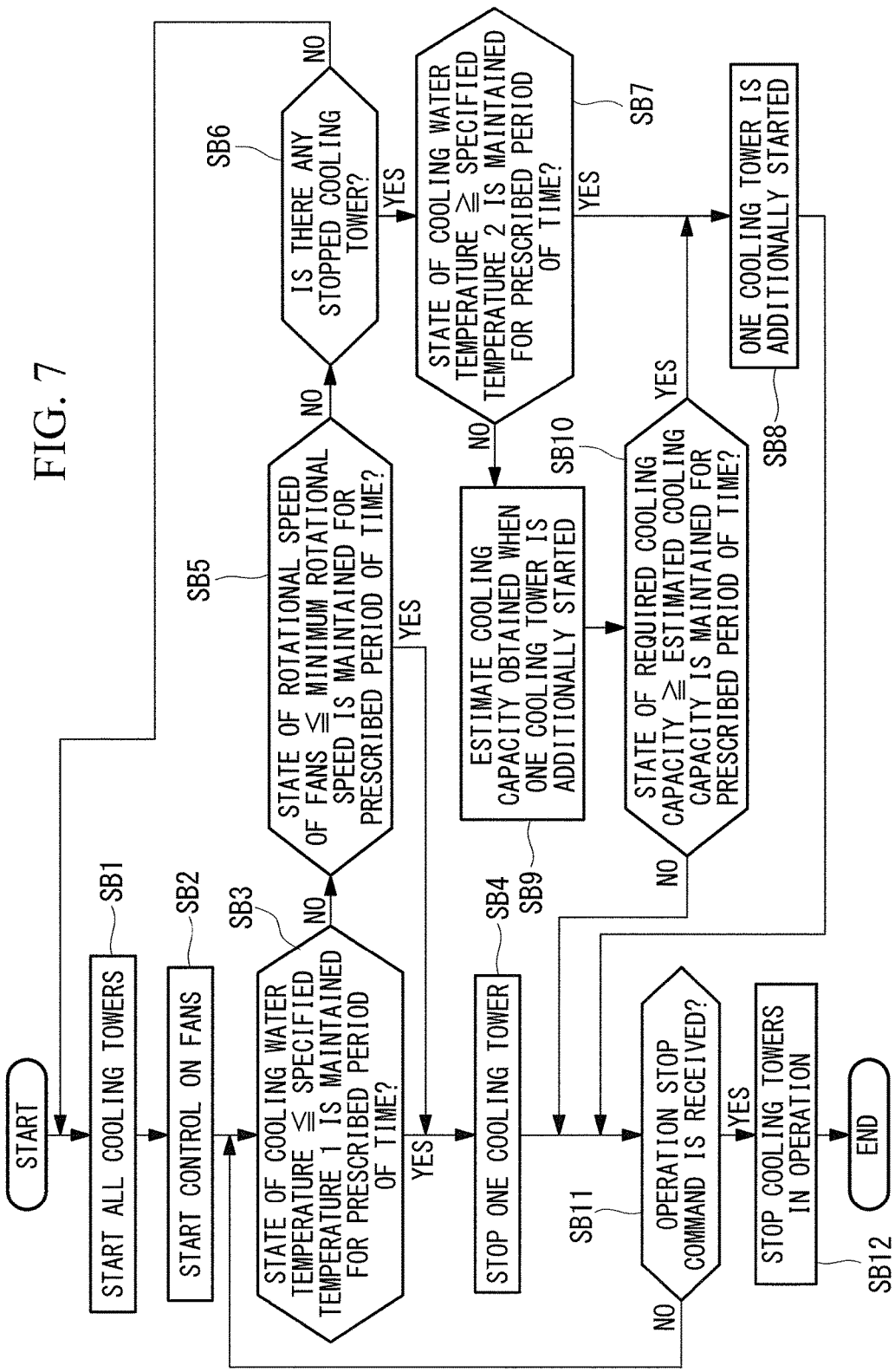
FIG. 7 is a flow chart illustrating the processing executed by a cooling tower control device according to a second embodiment of the present invention.

Hereinafter, the processing executed by a cooling tower control device 4 according to a second embodiment of the present invention will be described with reference to FIG. 7.

The present embodiment is formed by adding the processing of starting or stopping the cooling towers in consideration of the cooling water temperature to the above-described first embodiment. Since other configuration aspects are similar to those in the first embodiment, a description thereof is omitted.

First, the cooling tower control device 4 starts all the cooling towers upon reception of a cooling tower start command (step SB1). Consequently, the cooling towers 3*a*, 3*b*, and 3*c* are started and fans are rotated, so that cooling water is started to be cooled.

Next, when start of the respective cooling towers 3*a*, 3*b*, and 3*c* is completed, the cooling tower control device 4 starts to control the rotational speeds of the fans included in the respective cooling towers 3*a*, 3*b*, and 3*c* (step SB2). As a consequence, the rotational speeds of the fans in the respective cooling towers 3*a*, 3*b*, and 3*c* are controlled so that a cooling tower outlet temperature To reaches a preset temperature. In the present embodiment, the rotational speeds of the fans included in the respective cooling towers 3*a*, 3*b*, and 3*c* are controlled to be identical.

Next, the cooling tower control device 4 determines whether or not a cooling water temperature, i.e., the cooling tower outlet temperature To, is maintained in the state of being equal to or below a specified temperature 1 set in advance for a prescribed period of time (step SB3). Here, the specified temperature 1 is a specified threshold value used as a basis of forcible stop of the cooling towers. The specified threshold value is based on a lower limit of the cooling water temperature determined by the chiller.

As a result, when the cooling water temperature is maintained in the state of being equal to or below the specified temperature 1 for the prescribed period of time, one cooling tower is stopped (step SB4) and the processing proceeds to step SB11.

On the contrary, when it is determined in step SB3 that the cooling water temperature is not maintained in the state of being equal to or below the specified temperature 1 for the prescribed period of time ("NO" in step SB3), then the cooling tower control device 4 determines whether or not the rotational speeds of the fans are maintained in the state of being equal to or below a preset minimum rotational speed for a prescribed period of time (for example, 60 sec) (step SB5). Here, the minimum rotational speed is a lower limit rotational speed generally set to prevent operation at an extremely low rotational speed. The minimum rotational speed may be a value with an arbitrary margin added to the lower limit rotational speed.

As a result, when the rotational speeds of the fans are maintained in the state of being equal to or below the preset minimum rotational speed for the prescribed period of time, one cooling tower is stopped (step SB4) and the processing proceeds to step SB11.

When it is determined in step SB5 that the rotational speeds of the fans are not maintained in the state of being equal to or below the preset minimum rotational speed for the prescribed period of time, ("NO" in step SB5), then it is determined whether or not there is any stopped cooling tower (step SB6). As a result, when there is no stopped cooling tower, the processing returns to step SB1. When there is any stopped cooling tower, the cooling tower control device 4 determines whether or not the cooling water temperature, i.e., the cooling tower outlet temperature To, is maintained in the state of being equal to or above a specified temperature 2 set in advance for a prescribed period of time (step SB7). Here, the specified temperature 2 is a specified threshold value used as a basis of forcible start of an additional cooling tower. The specified threshold value is a value with an arbitrary margin added to outside air wet-bulb temperature or outside air dry-bulb temperature.

As a result, when the cooling water temperature is maintained in the state of being equal to or above the specified temperature 2 for the prescribed period of time, one cooling tower is additionally started (step SB8) and the processing proceeds to step SB11.

On the contrary, when it is determined in step SB7 that the cooling water temperature is not maintained in the state of being equal to or above the specified temperature 2 for the prescribed period of time ("NO" in step SB7), the cooling capacity obtained from operating the cooling towers in operation and one more cooling tower at an minimum rotational speed is estimated (step SB9).

Next, it is determined whether or not the cooling capacity required for the cooling towers as a whole is maintained in the state of being equal to or above the cooling capacity estimated in step SB9 for a prescribed period of time (for example, 300 sec) (step SB10). As a result, when the state is maintained for the prescribed period of time, one cooling tower out of the stopped cooling towers is additionally started (step SB8), and the processing proceeds to step SB11.

On the contrary, when it is determined in step SB10 that the state is not maintained for the prescribed period of time, the processing proceeds to step SB11.

In step SB11, it is determined whether or not an operation stop command is received. When the command is not received, the processing returns to step SB3, and the above-described processes are repeated. When the operation stop command is received, the cooling towers in operation are stopped (step SB12), and the processing is ended.

As described in the foregoing, in the device and method of controlling cooling towers, and the heat source system according to the present embodiment, the cooling towers are started or stopped in consideration of the cooling water temperature. Accordingly, the cooling water can directly be controlled within a specified range, so that the cooling water system and the chiller can stably be operated.

Third Embodiment

Figure 8:
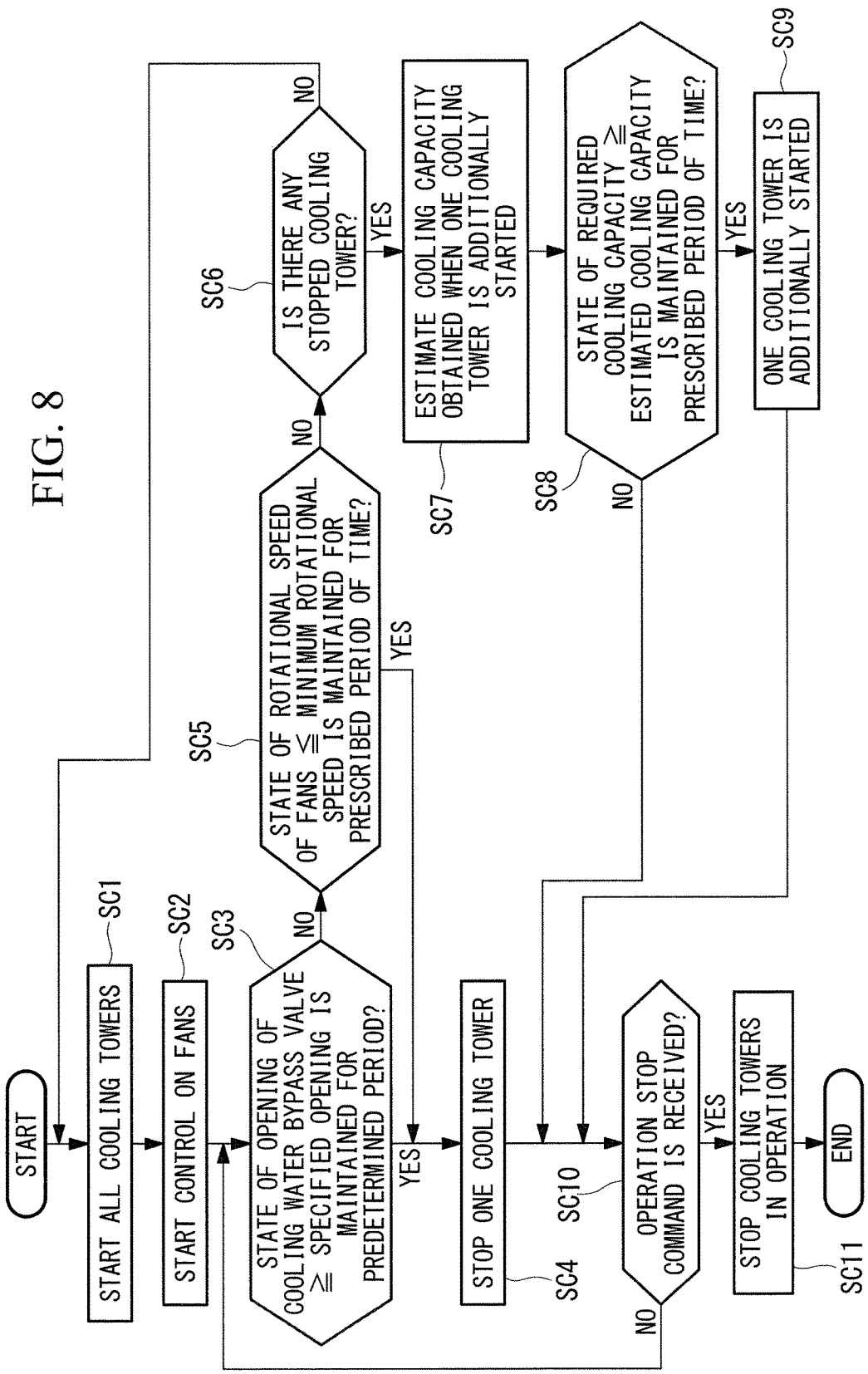
FIG. 8 is a flow chart illustrating the processing executed by a cooling tower control device according to a third embodiment of the present invention.

Hereinafter, the processing executed by a cooling tower control device 4 according to a third embodiment of the present invention will be described with reference to FIG. 8.

The present embodiment is formed by adding the processing of stopping the cooling towers in consideration of an opening of a cooling water bypass valve to the above-described first embodiment. Since other configuration aspects are similar to those in the first embodiment, a description thereof is omitted.

First, the cooling tower control device 4 starts all the cooling towers upon reception of a cooling tower start command (step SC1). Consequently, the cooling towers 3a, 3b, and 3c are started and fans are rotated, so that cooling water is started to be cooled.

Next, when start of the respective cooling towers 3a, 3b, and 3c is completed, the cooling tower control device 4 starts to control the rotational speeds of the fans included in the respective cooling towers 3a, 3b, and 3c (step SC2). As a consequence, the rotational speeds of the fans in the respective cooling towers 3a, 3b, and 3c are controlled so that a cooling tower outlet temperature To reaches a preset temperature. In the present embodiment, the rotational speeds of the fans included in the respective cooling towers 3a, 3b, and 3c are controlled to be identical.

Next, the cooling tower control device 4 determines whether or not the opening of the cooling water bypass valve 13 is maintained in the state of being equal to or above a specified opening set in advance for a prescribed period of time (step SC3). Here, the specification opening is a specified threshold value used as a basis of forcible stop of the cooling towers.

As a result, when the opening of the cooling water bypass valve 13 is maintained in the state of being equal to or above the specified opening for the prescribed period of time, one cooling tower is stopped (step SC4) and the processing proceeds to step SC10.

When it is determined in step SC3 that the opening of the cooling water bypass valve 13 is not maintained in the state of being equal to or above the specified opening for the prescribed period of time ("NO" in step SC3), then the cooling tower control device 4 determines whether or not the rotational speeds of the fans are maintained in the state of being equal to or below a preset minimum rotational speed for a prescribed period of time (for example, 60 sec) (step SC5). Here, the minimum rotational speed is a lower limit rotational speed generally set to prevent operation at an extremely low rotational speed. The minimum rotational speed may be a value with an arbitrary margin added to the lower limit rotational speed.

As a result, when the rotational speeds of the fans are maintained in the state of being equal to or below the preset minimum rotational speed for the prescribed period of time, one cooling tower is stopped (step SC4) and the processing proceeds to step SC10.

When it is determined in step SC5 that the rotational speeds of the fans are not maintained in the state of being equal to or below the preset minimum rotational speed for the prescribed period of time, ("NO" in step SC5), then it is determined whether or not there is any stopped cooling tower (step SC6). As a result, when there is no stopped cooling tower, the processing returns to step SC1, whereas when there is any stopped cooling tower, the cooling capacity to be obtained from operating all the cooling towers in operation and one more cooling tower at the minimum rotational speed is estimated (step SC7).

Next, it is determined whether or not the cooling capacity required for the cooling towers as a whole is maintained in the state of being equal to or above the cooling capacity estimated in step SC7 for a prescribed period of time (for example, 300 sec) (step SC8). As a result, when the state is maintained for the prescribed period of time, one cooling tower out of the stopped cooling towers is additionally started (step SC9), and the processing proceeds to step SC10.

On the contrary, when it is determined in step SC8 that the state is not maintained for the prescribed period of time, the processing proceeds to step SC10.

In step SC10, it is determined whether or not an operation stop command is received. When the command is not received, the processing returns to step SC3, and the above-described processes are repeated. When the operation stop command is received, the cooling towers in operation are stopped (step SC11), and the processing is ended.

As described in the foregoing, in the device and method of controlling cooling towers, and the heat source system according to the present embodiment, the cooling towers are stopped in consideration of the cooling water bypass valve 13. As a consequence, inefficient excessive operation of the cooling towers can be avoided, and the power consumption in the cooling towers can be suppressed.

Fourth Embodiment

Figure 9:
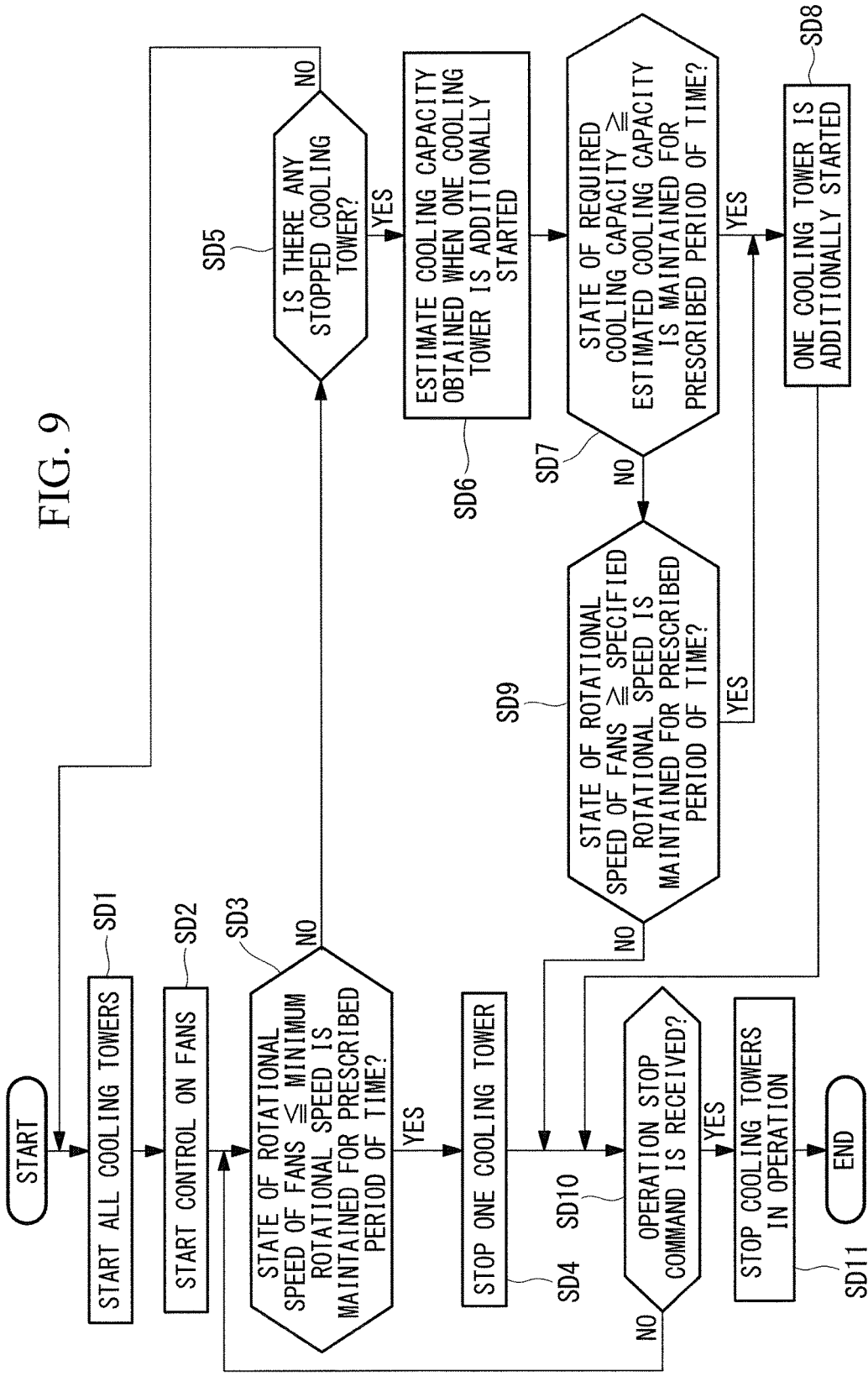
FIG. 9 is a flow chart illustrating the processing executed by a cooling tower control device according to a fourth embodiment of the present invention.

Hereinafter, the processing executed by a cooling tower control device 4 according to a fourth embodiment of the present invention will be described with reference to FIG. 9.

The present embodiment is formed by adding the processing of starting the cooling towers in consideration of deterioration of the cooling towers to the above-described first embodiment. Since other configuration aspects are similar to those in the first embodiment, a description thereof is omitted.

First, the cooling tower control device 4 starts all the cooling towers upon reception of a cooling tower start command (step SD1). Consequently, the cooling towers 3a, 3b, and 3c are started and fans are rotated, so that cooling water is started to be cooled.

Next, when start of the respective cooling towers 3a, 3b, and 3c is completed, the cooling tower control device 4 starts to control the rotational speeds of the fans included in the respective cooling towers 3a, 3b, and 3c (step SD2). As a consequence, the rotational speeds of the fans in the respective cooling towers 3a, 3b, and 3c are controlled so that a cooling tower outlet temperature To reaches a preset temperature. In the present embodiment, the rotational speeds of the fans included in the respective cooling towers 3a, 3b, and 3c are controlled to be identical.

The cooling tower control device 4 then determines whether or not the rotational speeds of the fans are maintained in the state of being equal to or below a preset minimum rotational speed for a prescribed period of time (for example, 60 sec) (step SD3). Here, the minimum rotational speed is a lower limit rotational speed generally set to prevent operation at an extremely low rotational speed. The minimum rotational speed may be a value with an arbitrary margin added to the lower limit rotational speed.

As a result, when the rotational speeds of the fans are maintained in the state of being equal to or below the preset minimum rotational speed for the prescribed period of time, one cooling tower is stopped (step SD4) and the processing proceeds to step SD10.

On the contrary, when it is determined in step SD3 that the rotational speed of the fans are not maintained in the state of being equal to or below the preset minimum rotational speed for the prescribed period of time, ("NO" in step SD3), then it is determined whether or not there is any stopped cooling tower (step SD5). As a result, when there is no stopped cooling tower, the processing returns to step SD1, whereas when there is any stopped cooling tower, the cooling capacity to be obtained from operating all the cooling towers in operation and one more cooling tower at the minimum rotational speed is estimated (step SD6).

Next, it is determined whether or not the cooling capacity required for the cooling towers as a whole is maintained in the state of being equal to or above the cooling capacity estimated in step SD6 for a prescribed period of time (for example, 300 sec) (step SD7). As a result, when the state is maintained for the prescribed period of time, one cooling tower out of the stopped cooling towers is additionally started (step SD8), and the processing proceeds to step SD10.

On the contrary, when it is determined in step SD7 that the cooling capacity required for the cooling towers as a whole is not maintained in the state of being equal to or above the estimated cooling capacity for the prescribed period of time, then the cooling tower control device 4 determines whether or not the rotational speeds of the fans are maintained in the state of being equal to or above a specified rotational speed set in advance for a prescribed period of time (for example, 60 sec) (step SD9). Here, the specified rotational speed is a rotational speed set as a value for determining deterioration in order to prevent the cooling towers having deteriorated performance form being continuously operated at a high rotational speed.

As a result, when the rotational speeds of the fans are maintained in the state of being equal to or above the specified rotational speed for the prescribed period of time, one cooling tower is additionally started (step SD8) and the processing proceeds to step SD10.

On the contrary, when it is determined in step SD9 that the state is not maintained for the prescribed period of time, the processing proceeds to step SD10.

In step SD10, it is determined whether or not an operation stop command is received. When the command is not received, the processing returns to step SD3, and the above-described processes are repeated. When the operation stop command is received, the cooling towers in operation are stopped (step SD11), and the processing is ended.

As described in the foregoing, in the device and method of controlling cooling towers, and the heat source system according to the present embodiment, the cooling towers are started in consideration of the cooling tower deterioration. This makes it possible to avoid continuation of inefficient operation at a high fan rotational speed, and the power consumption of the cooling towers can be suppressed.

Although the embodiments of the present invention have been described in full detail with reference to the drawings, the concrete configurations thereof are not limited to those described in the embodiments, and modifications in design which come within the scope of the present invention are intended to be embraced therein.

REFERENCE SIGNS LIST

1 Heat source system
2 Chiller
3a, 3b, 3c Cooling tower
4 Cooling tower control device
6 Forward pipe
7 Return pipe
8 Feed header
9 Return header
19 Cooling water pump
12 Bypass pipe
13 Cooling water bypass valve (bypass valve)
15 Flow rate sensor
16, 17 Temperature sensor

The invention claimed is:

1. A cooling tower control device that controls a heat source system including a plurality of cooling towers connected in parallel to a common chiller, comprising:
  a processing device and a computer readable non-transitory recording medium that stores a program that causes the processing device to:
  start fans of all the cooling towers irrespective of a cooling capacity required for the cooling towers as a whole at a start of the heat source system.

2. The cooling tower control device according to claim 1, wherein the program further causes the processing device to:
  stop any one of the cooling towers when rotational speeds of the fans in the cooling towers in operation are maintained in a state of being equal to or below a preregistered minimum rotational speed for a prescribed period of time.

3. The cooling tower control device according to claim 2, wherein the program further causes the processing device to:
  estimate, as an estimation section, a cooling capacity to be obtained from operating each of the fans in the cooling towers currently in operation and one more cooling tower at the minimum rotational speed, while at least one of the cooling towers is stopped; and
  determine, as a determination section, whether or not the cooling capacity required for the cooling towers as a whole is maintained in a state of being equal to or above the cooling capacity estimated by the estimation section for a prescribed period of time, wherein
  when the determination section determines that the state is maintained for the prescribed period of time, one of the stopped cooling towers is started.

4. The cooling tower control device according to claim 3, wherein the program further causes the processing device to:
  set a start priority in descending order of cooling efficiency of the cooling towers, and
  determine the cooling towers to be stopped and the cooling towers to be restarted based on the start priority.

5. The cooling tower control device according to claim 1, wherein the program further causes the processing device to:
  operate the fans of the respective cooling towers at an identical rotational speed irrespective of the cooling efficiency of the cooling towers.

6. The cooling tower control device according to claim 1, wherein the program further causes the processing device to:
  while at least one of the cooling towers is stopped, start any one cooling tower among the stopped cooling towers when cooling water temperature is maintained in a state of being equal to or above a specified threshold value for a prescribed period of time, and
  stop any one cooling tower among the cooling towers in operation when the cooling water temperature is maintained in a state of being equal to or below a specified threshold value for a prescribed period of time.

7. The cooling tower control device according to claim 1, wherein the program further causes the processing device to:
while at least one of the cooling towers is stopped, start any one cooling tower among the stopped cooling towers when the rotational speeds of the fans in the cooling towers are maintained in a state of being equal to or above a specified threshold value for a prescribed period of time.

8. A heat source system, comprising:
a chiller;
a plurality of cooling towers connected in parallel to the chiller; and
a cooling tower control device according to claim 1.

9. The heat source system according to claim 8, comprising:
a forward pipe supplying cooling water used in the chiller to each of the cooling towers;
a return pipe supplying the cooling water cooled in each of the cooling towers to the chiller;
a bypass pipe connecting the forward pipe and the return pipe; and
a bypass valve provided in the bypass pipe, wherein
the program further causes the processor to:
stop any one cooling tower among the cooling towers in operation when an opening of the bypass valve is maintained in a state of being equal to or above a specified opening for a prescribed period of time.

10. A method of controlling cooling towers applied to a heat source system including a plurality of cooling towers connected in parallel to a common chiller, the method comprising
starting fans of all the cooling towers irrespective of a cooling capacity required for the cooling towers as a whole, at a start of the heat source system.

* * * * *